(12) United States Patent
Rothschild et al.

(10) Patent No.: US 8,881,190 B1
(45) Date of Patent: Nov. 4, 2014

(54) SYSTEMS, METHODS, AND APPARATUS FOR ATTACKING DIGITAL WATERMARKS

(75) Inventors: Keith Alan Rothschild, Dunwoody, GA (US); Julius Bert Bagley, Lawrenceville, GA (US)

(73) Assignee: Cox Communications, Inc., Atlanta, GA (US)

( * ) Notice: Subject to any disclaimer, the term of this patent is extended or adjusted under 35 U.S.C. 154(b) by 192 days.

(21) Appl. No.: 12/900,909

(22) Filed: Oct. 8, 2010

(51) Int. Cl.
*H04H 60/32* (2008.01)
*H04N 9/80* (2006.01)

(52) U.S. Cl.
USPC ............................................ 725/19; 386/260

(58) Field of Classification Search
CPC ................ H04N 21/8358; H04N 21/23892
USPC .................................... 386/260; 725/136, 19
See application file for complete search history.

(56) References Cited

U.S. PATENT DOCUMENTS

| | | | |
|---|---|---|---|
| 2006/0080538 A1* | 4/2006 | Kusuda et al. | 713/176 |
| 2008/0279536 A1* | 11/2008 | Levy | 386/95 |
| 2008/0310673 A1* | 12/2008 | Petrovic et al. | 382/100 |
| 2009/0031134 A1* | 1/2009 | Levy | 713/176 |
| 2009/0326961 A1* | 12/2009 | Petrovic et al. | 704/500 |

* cited by examiner

*Primary Examiner* — Nasser Goodarzi
*Assistant Examiner* — Michael Hong
(74) *Attorney, Agent, or Firm* — Sutherland Asbill & Brennan LLP (57) ABSTRACT

Systems, methods, and apparatus for attacking digital watermarks are provided. A system or apparatus may include at least one interface and at least one processing component. The at least one interface may be configured to receive digital content output by a service reception device. The service reception device may be configured to receive the digital content from a service provider prior to the receipt of the digital content by the at least one interface. The at least one processing component may be configured to attack a digital watermark incorporated into the digital content.

14 Claims, 3 Drawing Sheets

SYSTEMS, METHODS, AND APPARATUS FOR ATTACKING DIGITAL WATERMARKS

FIELD OF THE INVENTION

Aspects of the invention relate generally to digital watermarks, and more particularly, to systems, methods, and apparatus that may be utilized to identify and/or attack digital watermarks.

BACKGROUND OF THE INVENTION

Digital watermarking is utilized for a wide variety of different purposes, such as source tracking and broadcast monitoring. A digital watermark typically includes embedded information that is added to digital content, such as digital audio and/or digital video content. In many instances, a digital watermark is imperceptible to a human observer. Once a digital watermark is added to digital content, the digital content is typically either output for presentation or distributed via electronic transmission or physical media (e.g., CD-ROMs, etc.).

BRIEF DESCRIPTION OF THE INVENTION

Embodiments of the invention may include systems, methods, and apparatus for attacking digital watermarks. In one embodiment, a system for attacking a digital watermark may be provided. The system may include at least one interface and at least one processing component. The at least one interface may be configured to receive digital content output by a service reception device. The service reception device may be configured to receive the digital content from a service provider prior to the receipt of the digital content by the at least one interface. The at least one processing component may be configured to attack a digital watermark incorporated into the digital content.

In accordance with another embodiment of the invention, a system for attacking a digital watermark may be provided. The system may include at least one memory and at least one processor. The at least one memory may be configured to store computer-executable instructions. The at least one processor may be configured to access the at least one memory and execute the computer-executable instructions to (i) receive digital content output by a service reception device configured to receive the digital content from a service provider and (ii) attack a digital watermark incorporated into the digital content.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for attacking digital watermarks that are included in digital content. In certain embodiments, a system or apparatus may be provided that is configured to receive digital content output by a service reception device. The service reception device may be configured to receive digital content from a service provider. The system or apparatus may receive digital content from a wide variety of different types of service reception devices, such as a cable set-top box, a satellite set-top box, a virtual set-top box, an embedded set-top box, a broadband modem, a personal computer or other computing device connected to the Internet, a mobile device, etc. Additionally, a wide variety of different types of digital content may be received from the service reception device, such as digital audio content (e.g., music, etc.), digital video content (e.g., movies, television shows, etc.), and/or a combination of digital audio and digital video content.

According to an aspect of the invention, the digital content may include at least one digital watermark. The digital watermark may include digital information and/or data embedded in the digital content. For example, the digital watermark may include one or more bits inserted into a digital image, a digital audio file, or a digital video file. A wide variety of suitable techniques may be utilized to embed a digital watermark into the digital content, including but not limited to, a spread-spectrum technique, a quantization technique, an amplitude modulation technique, etc. Additionally, a wide variety of different types of digital watermarks may be added, including but not limited to, spatially-based watermarks, geometrically invariant watermarks, time-based watermarks, object-based watermarks, scene-based watermarks, watermarks that utilize one or more perceptual masks, multiple orthogonal watermarks, etc. In certain embodiments, a digital watermark may be embedded in the digital content by the service reception device. In other embodiments, a digital watermark may be embedded in the digital content prior to receipt of the content by the service reception device.

Additionally, in certain embodiments, a digital watermark may be relatively imperceptible to a human to which the digital content is presented. In other words, the digital watermark may be a watermark that cannot be perceived by a user when the digital content is output or may be a watermark that does not substantially affect the ability of the user to consume the digital content when the digital content is output. For example, a digital watermark embedded in audio data may include audio data that will be output at an inaudible frequency that cannot be perceived by the human ear. As another example, a digital watermark embedded in an image or video data may result in relatively slight modifications to the image that cannot be easily detected and/or identified by a human.

Once the digital content has been received from the service reception device, the system or apparatus may attack a digital watermark incorporated into the digital content. A wide variety of suitable techniques may be utilized as desired to attack the digital watermark. As one example, the digital watermark may be identified and removed from the digital content. As another example, the digital watermark may be obscured utilizing a suitable collusion technique. As yet another example, the digital watermark may be jammed by overlaying competing information on the digital watermark. In certain embodiments, multiple techniques may be utilized to attack a digital watermark. Additionally, in certain embodiments, a type of digital watermark that is utilized may be identified, and the digital watermark may be attacked based upon the identified type. In other embodiments, a plurality of different types of digital watermarks may be attacked. In certain embodiments, a digital watermark and/or a type of digital watermark may be identified or determined based upon an analysis of the digital content. In other embodiments, a digital watermark and/or a type of digital watermark may be identified or determined based upon an analysis of multiple copies of the digital content, such as multiple copies that are obtained from different service reception devices.

Additionally, in certain embodiments, a digital watermark may be attacked in real-time or near real-time. For example, digital content may be received from a service reception device, a digital watermark may be attacked, and the digital content may be output in real-time or near real-time for display or presentation by a suitable output device, such as a television.

System Overview

An example system 100 for attacking digital watermarks will now be described illustratively with respect to FIG. 1. The system 100 may include, for example, any number of service reception devices 105, a watermark attacking device 110, and/or any number of output devices 115. In operation, a service reception device 105 may be configured to receive digital content from a service provider 120, such as a cable service provider or a satellite service provider, via any number of suitable networks 125, such as a cable network, a satellite network, the Internet, etc. As desired, the service provider 120 may receive at least a portion of the digital content from one or more content providers 130, such as broadcast entities and/or other content providers. Once received by a service reception device 105, the digital content may be output by the reception device for presentation to one or more users via the output devices 115 (e.g., a television, a stereo system, a speaker, etc.). The output content may be received by the watermark attacking device 110, and the watermark attacking device may attack a digital watermark included in the output content.

Figure 1:
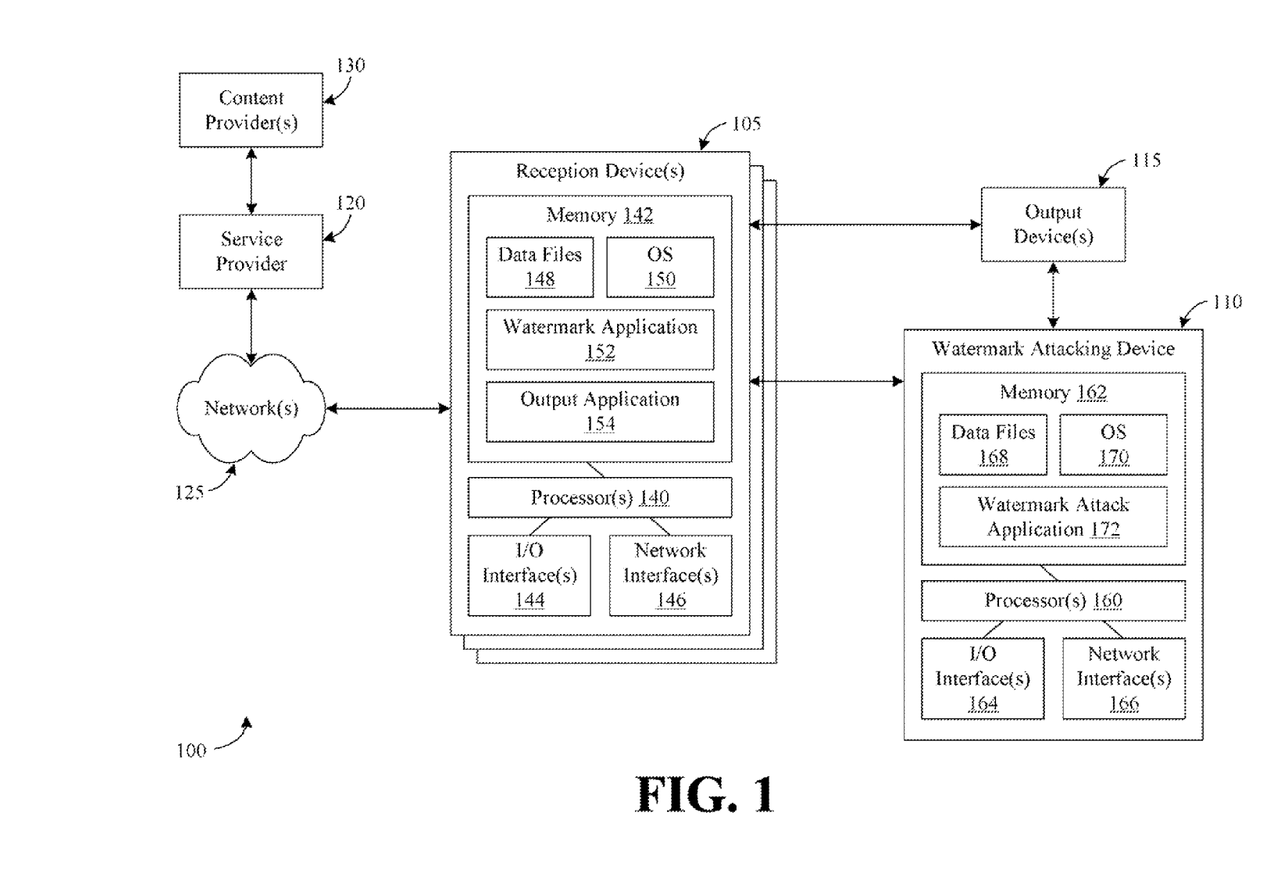
FIG. 1 illustrates a block diagram of an example system that may be utilized to attack digital watermarks, according to an example embodiment of the invention.

With reference to FIG. 1, each service reception device 105 may be any suitable device and/or software application that is capable of receiving and processing a signal output by a service provider 120, such as a broadband signal (e.g., a cable signal, satellite signal, etc.) or another signal including digital content. Examples of suitable service reception devices 105 include, but are not limited to, a set-top box ("STB") (e.g., a cable STB, a digital satellite STB, an Internet Protocol Television STB, etc.), a virtual STB, an embedded STB, a broadband modem, or a mobile device (e.g., a mobile telephone, personal digital assistant, etc.). In certain embodiments, the service reception device 105 may be in communication with any number of output devices 115 that facilitate presentation of digital content, such as a television, a stereo, a speaker, a computer, or other output devices. In other embodiments, the service reception device 105 may be embedded, incorporated into, and/or executed on an output device 115. For example, a set-top box application may be embedded into a television. In yet other embodiments, the service reception device 105 may include one or more output devices 115. For example, a mobile device may include one or more output devices.

In operation, the service reception device 105 may receive digital content from a service provider. For example, the service reception device 105 may receive at least a portion of a broadband data signal that is output by the service provider 120. As another example, the service reception device 105 may download digital content and/or receive a stream of digital content from a Website or Web server hosted by the service provider 120. As desired, the service reception device 105 may convert at least a portion of the received digital content into content which is suitable for display or other output by the output devices 115. As desired, the service reception device 105 may receive a broadband data signal and/or other digital content via any number of suitable networks 125, such as a cable network that includes any number of optical fibers, coaxial cables, and/or cable drops, a satellite network that includes a suitable satellite dish and/or connecting cables, the Internet, and/or other suitable networks. Additionally, any number of intermediary devices, such as broadband modems, routers, etc., may be situated between the source of the digital content (i.e., the service provider) and the service reception device 105.

As desired, a broadband signal that is provided to the service reception device 105 may include a wide variety of data components, including but not limited to, a television signal, a digital television signal, data associated with Internet service, etc. Additionally, a received broadband signal, stream of digital content, and/or other digital content may include a wide variety of different types of digital data, such as digital images, digital audio data (e.g., music, etc.), digital video data, etc. The service reception device 105 may receive and process the received digital content. As desired, the service reception device 105 may selectively output a portion of the digital content, such as digital television data (e.g., audio and/or video data) for receipt by the output devices 115 and presentation to a user. As desired, any number of suitable connections and/or connecting devices, such as coaxial cables, High-Definition Multimedia Interface ("HDMI") cables, audio cables, etc., may be utilized to connect the service reception device 105 to one or more output devices 115.

In one example embodiment, a service reception device 105 may include any number of suitable processor-driven devices that facilitate the receipt, processing, and/or output of digital content. As such, the service reception device 105 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions by the service reception device 105 may form a special purpose computer or other particular machine that is operable to facilitate the processing and/or output of digital content.

In addition to having one or more processors 140, the service reception device 105 may include one or more memory devices 142, input/output ("I/O") interfaces 144, and/or network interfaces 146. The memory devices 142 may include any number of suitable memory devices, such as caches, read-only memory devices, random access memory devices, magnetic storage devices, etc. The memory devices 142 may store data, executable instructions, and/or various program modules utilized by the processors 140, for example, data files 148, an operating system ("OS") 150, a watermark application 152, and/or an output application 154. The data files 148 may include any suitable data that facilitates the receipt of digital content, the processing of digital content, and/or the output of digital content. For example, the data files 148 may include, but are not limited to, information associated with the service reception device 105, information associated with the processing of digital watermarks, information associated with one or more output devices 115, information associated with processing user input and commands (e.g., remote control input), information associated with formatting components of digital content for presentation, etc.

The OS 150 may be a suitable software module that controls the general operation of the service reception device 105. The OS 150 may also facilitate the execution of other software modules, for example, the watermark application 152 and/or the output application 154. The watermark application 152 may be a suitable software module that is configured to identify digital watermarks included in the digital content, modify digital watermarks, and/or insert digital watermarks into the digital content. In certain embodiments, the watermark application 152 may utilize any number of suitable algorithms that facilitate the identification of a digital watermark embedded in digital content by the service provider 120, the content provider 130, or other upstream devices or systems. For example, an algorithm received from the service provider 120 and/or preprogrammed into the service reception device 105 may be utilized to identify a digital watermark. Once a digital watermark has been identified, the watermark application 152 may verify the digital watermark, store information associated with the identified digital watermark, and/or modify the digital watermark. For example, a digital watermark may be modified to include identifying information associated with the service reception device 105. In other embodiments, the watermark application 152 may embed a digital watermark, such as a digital watermark including identifying information associated with the service reception device 105, into the digital content. As a result of modifying and/or embedding digital watermarks, the service reception device 105 may embed a signature of the service reception device 105 into the digital content.

A wide variety of different types of digital watermarks may be embedded into digital content by a content provider 130, service provider 120, and/or service reception device 105. Examples of suitable digital watermarks include, but are not limited to, spatially-based watermarks, geometrically invariant watermarks, time-based watermarks, object-based watermarks, scene-based watermarks, watermarks that utilize perceptual masks, multiple orthogonal watermarks, etc. Additionally, as desired, multiple digital watermarks and/or multiple types of digital watermarks may be embedded into digital content.

The output application 154 may be a suitable software module that is configured to process and/or format digital content for output to one or more output devices 115. In certain embodiments, the output application 154 may direct digital content comprising one or more digital watermarks to be output by the service reception device 105 via any number of suitable output ports and/or communication interfaces. In this regard, the digital content may be received by the output devices 115 and presented to a user. Additionally, the digital content may be received by a watermark attacking device 110.

With continued reference to the service reception device 105, the one or more I/O interfaces 144 may facilitate communication between the service reception device 105 and one or more input/output devices, for example, one or more user interface devices, such as a television, monitor, remote control, microphone, speaker, etc., that facilitate user interaction with the service reception device 105. In this regard, digital content may be output for presentation. For example, digital content may be provided to one or more suitable output ports for output by the service reception device 105 and receipt by one or more output devices 115 and/or the watermark attacking device 110. Additionally, one or more user commands may be received by the service reception device 105.

The one or more network interfaces 146 may facilitate connection of the service reception device 105 to one or more suitable networks, for example, the networks 125 illustrated in FIG. 1. In this regard, the service reception device 105 may be configured to connect to one or more suitable networks 125, such as a cable network, satellite network, the Internet, etc., and receive digital data that is output by the service provider 120.

With continued reference to FIG. 1, a watermark attacking device 110 may be any suitable device or apparatus that is capable of receiving digital content output by a service reception device 105 and attacking one or more digital watermarks embedded in the digital content. In certain embodiments, the watermark attacking device 110 may include any number of suitable processor-driven devices that facilitate the attacking of digital watermarks. For example, the watermark attacking device 110 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions by the watermark attacking device 110 may form a special purpose computer or other particular machine that is operable to facilitate the receipt of digital content from one or more service reception devices 105 and the attack of one or more digital watermarks embedded in the digital content.

In addition to having one or more processors 160, the watermark attacking device 110 may include one or more memory devices 162, input/output ("I/O") interfaces 164, and/or network interfaces 166. The memory devices 162 may include any number of suitable memory devices, such as caches, read-only memory devices, random access memory devices, magnetic storage devices, etc. The memory devices 162 may store data, executable instructions, and/or various program modules utilized by the processors 160, for example, data files 168, an operating system ("OS") 170, and/or a watermark attack application 172. The data files 168 may include any suitable data that facilitates the receipt of digital content, the processing of digital content, and/or the attacking of one or more digital watermarks included in the digital content. For example, the data files 168 may include, but are not limited to, information associated with the identification of digital watermarks, information associated with the processing techniques and/or methods that facilitate the removal, collusion, and/or jamming of digital watermarks, information associated with the output of the modified digital content once the digital watermarks have been attacked, and/or information associated with the storage of the modified digital content.

The OS 170 may be a suitable software module that controls the general operation of the watermark attacking device 110. The OS 170 may also facilitate the execution of other software modules, for example, the watermark attack application 172. The watermark attack application 172 may be a suitable software module that is configured to attack one or more digital watermarks included in the received digital content. A wide variety of suitable methods, algorithms, and/or techniques may be utilized as desired by the watermark attack application 172 to attack a digital watermark. For example, in certain embodiments, a digital watermark may be identified and removed, stripped, or extracted from the digital content. To facilitate a watermark removal, the watermark attack application 172 may identify data bits associated with the digital watermark embedded in the digital content, and the watermark attack application 172 may remove and/or replace the identified data bits associated with the digital watermark. A wide variety of suitable methods may be utilized as desired to identify a digital watermark. For example, multiple copies or versions of the digital content may be compared to one another in order to identify data bits that are different in various copies of the digital content. The differing data may be identified as data that is likely associated with a digital watermark. As another example, data may be identified that is not optimal for the space in which the data is included, and the identified data may be identified as a digital watermark. As yet another example, audio data that is outside of an audible frequency range for the human ear may be identified as digital watermark data. Other suitable methods may be utilized as desired to identify a digital watermark. Once a digital watermark has been identified, the digital watermark may be removed or stripped from the digital content by programmatically removing the digital watermark bits and/or by replacing the digital watermark bits with other digital data. One example of the operations that may be performed by the watermark attacking device 110 and/or the watermark attack application 172 is described in greater detail below with reference to FIG. 3.

In other embodiments, a digital watermark may be attacked by a suitable collusion technique. A collusion technique may function to obscure a digital watermark in order to prevent the digital watermark from being subsequently identified or detected. In this regard, protection afforded by the digital watermark may be circumvented. A wide variety of different collusion techniques may be utilized as desired in various embodiments of the invention. As one example, multiple copies or versions of the digital content may be averaged together in order to obscure or collude a digital watermark.

In other embodiments, a digital watermark may be attacked by a suitable jamming technique. A jamming technique may function to overlay or overwrite competing information on top of a digital watermark. In this regard, protection afforded by the digital watermark may be circumvented. A wide variety of suitable jamming techniques may be utilized as desired in various embodiments of the invention. In certain embodiments, an attempt may be made to identify a digital watermark prior to overlaying competing information. In other embodiments, all or substantially all of the digital content may be altered or modified in order to jam a digital watermark included in the digital content.

As desired, the watermark attacking device 110 and/or the watermark attack application 172 may receive multiple copies of digital content. For example, multiple copies of digital content may be received from a plurality of different service reception devices 105. In certain embodiments, different copies of the digital content may include different digital watermarks. For example, different digital watermarks may be embedded into the digital content by different service reception devices 105. An analysis of multiple copies of the digital content by the watermark attacking device 110 may assist in the identification or detection of a digital watermark. Additionally, multiple copies of the digital content may be utilized in order to attack a digital watermark. For example, multiple copies of the digital content may be averaged together in order to attack the digital watermark.

In certain embodiments, a digital watermark may be attacked in real-time or near real-time by the watermark attacking device 110. For example, digital content may be received by the watermark attacking device 110 from a service reception device 105, a digital watermark included in the digital content may be attacked, and the modified digital content may be output by the watermark attacking device 110 in real-time or near real-time for receipt by one or more other devices, such as a television or other output devices 115. In this regard, other devices may be capable of utilizing the digital content that is processed by the watermark attacking device 110. In order to facilitate the output of modified digital content by the watermark attacking device 110 and/or receipt of the digital content by one or more output devices 115, any number of suitable output ports and/or wired or wireless communication interfaces may be incorporated into the watermark attacking device 110. Additionally, any number of suitable cables and/or wires (e.g., coaxial cables, HDMI cables, audio cables, etc.) may be utilized to facilitate communication between the watermark attacking device 110 and an output device 115.

In other embodiments, a digital watermark may be attacked in a non-real-time manner. For example, digital content may be received by the watermark attacking device 110 and, as desired, stored by the watermark attacking device 110. One or more digital watermarks included in the content may be attacked, and the modified content may be stored in a memory device associated with the watermark attacking device 110 and/or written to a removable storage device (e.g., a CD-ROM, a DVD, a memory card, etc.). As desired, the watermark attacking device 110 may include and/or be in communication with any number of suitable devices that facilitate the writing of modified digital content.

Additionally, as desired in certain embodiments, methodology-specific attacks may be utilized to attack one or more specific types of digital watermarks. A wide variety of different types of digital watermarks may be attacked as desired in various embodiments of the invention, including but not limited to, spatially-based watermarks, geometrically invariant watermarks, time-based watermarks, object-based watermarks, scene-based watermarks, watermarks that utilize perceptual masks, multiple orthogonal watermarks, etc. A spatially-based watermark may be a watermark that is generated based upon a spatial domain or frequency domain of the digital content, such as a spread spectrum watermark. A geometrically invariant watermark may be, for example, a watermark that typically appears in the same portion or area of the digital content. A time-based watermark may be, for example, a watermark that includes data embedded into multiple frames of digital content over a period of time. An object-based watermark may include, for example, the embedding of one or more objects (e.g., a circle, a square, another shape, etc.) into the digital content. A scene-based watermark may be, for example, a watermark that is embedded into a scene change associated with digital content (e.g., a go to black or fade to black event). A watermark that utilizes a perceptual mask may include, for example, watermarks that obfuscate information in order to hide the information from human perception. Multiple orthogonal watermarks may include, for example, any number of changing objects over frames and/or time. As desired, a combination of various types of watermarks may be utilized to embed a digital watermark. Additionally, as desired, the watermark attacking device 110 may identify or attempt to identify a type of watermarking technique that is utilized, and the watermark attacking device 110 may perform a methodology specific attack based at least in part on the identification.

In other embodiments, multiple types or methodologies of digital watermarks may be attacked simultaneously by a brute force method. For example, the watermark attack application 172 may execute an algorithm and/or programming instructions that automatically attack multiple types of digital watermarks in order to collude or jam any watermarks included in the digital content.

In certain embodiments, the watermark attacking device 110 may be a fully automated device. For example, the watermark attacking device 110 may be a fully automated device that automatically attacks digital watermarks in real-time or near real-time as the digital content is received. In other embodiments, the watermark attacking device 110 may facilitate an attack based at least in part on user interaction and/or received user instructions. For example, the watermark attacking device 110 may include one or more input devices (e.g., a keyboard, touch screen display, etc.) and/or a human machine interface that facilitates receipt of user input utilized by the watermark attacking device 110 to attack digital watermarks and/or modulate recovery of the digital content.

With continued reference to the watermark attacking device 110, the one or more I/O interfaces 164 may facilitate communication between the watermark attacking device 110 and one or more input/output devices, for example, one or more user interface devices, such as, a monitor, remote control, microphone, speaker, etc., that facilitate user interaction with the watermark attacking device 110. Additionally, the I/O interfaces 164 may facilitate output and/or writing or storage of modified digital content. In this regard, digital content may be output for presentation.

The one or more network interfaces 166 may facilitate connection of the watermark attacking device 110 to one or more suitable networks, for example, a wired network and/or a wireless network. In this regard, the watermark attacking device 110 may be configured to communicate with other components of the system 100.

With continued reference to FIG. 1, any number of suitable output devices 115 may be provided. An output device 115 may be any suitable device that facilitates presentation of digital content for consumption by one or more users. Examples of suitable output devices 115 include, but are not limited to, televisions, monitors, other display devices, stereos, and/or other audio output devices. An output device 115 may receive digital content from a service reception device 105 and/or a watermark attacking device 110, and the output device 115 may present or output the digital content.

The service provider 120 may include any number of suitable systems and/or devices that are capable of communicating digital content to and/or making digital content available to a service reception device 105. For example, the service provider 120 may include any number of cable head-end devices, conditional access systems, and/or encryption devices that are configured to output a broadband cable signal. As another example, the service provider 120 may include any number of suitable satellite head-end devices that are configured to output a broadband satellite signal. As another example, the service provider 120 may include any number of servers and/or other devices that facilitate the hosting of one or more Web pages and/or Web sessions through which digital content may be distributed to a service reception device 105.

The networks 125 may include any suitable network and/or combinations of networks that facilitate communication between the service provider 120 and one or more service reception devices 105. Examples of suitable networks include, but are not limited to, cable networks, satellite networks, the Internet, cellular networks, power line carrier networks, public-switched telephone networks, and/or any other suitable wired and/or wireless networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
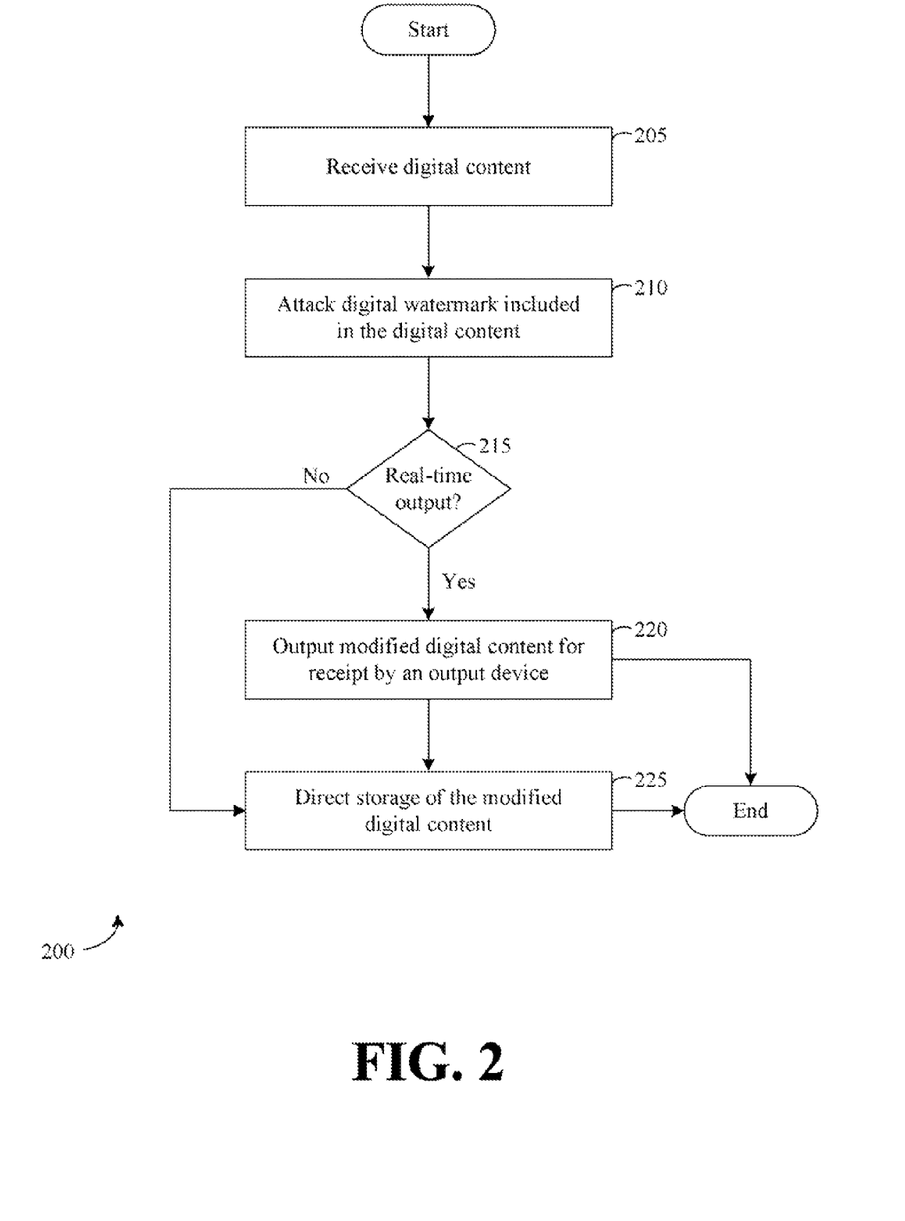
FIG. 2 is a flow diagram of an example method for processing digital content including a digital watermark, according to an example embodiment of the invention.

FIG. 2 is a flow diagram of an example method 200 for processing digital content including a digital watermark, according to an example embodiment of the invention. The method 200 may be performed by a suitable watermark attacking device, such as the watermark attacking device 110 illustrated in FIG. 1. The method 200 may begin at block 205.

At block 205, digital content may be received by the watermark attacking device 110. According to an aspect of the invention, the digital content may be received from a service reception device, such as the service reception device 105 illustrated in FIG. 1. As desired in certain embodiments, multiple copies of the digital content may be received from different service reception devices 105.

At block 210, one or more digital watermarks included in the received digital content may be attacked by the watermark attacking device 110. A wide variety of suitable methods and/or techniques may be utilized as desired to attack a digital watermark, including but not limited to, the example techniques described above with reference to FIG. 1. One example of the operations that may be utilized to attack a digital watermark is described in greater detail below with reference to FIG. 3. As a result of attacking a digital watermark, the digital content may be altered such that the digital watermark may not be recognized and/or utilized by subsequent devices that process the digital content.

At block 215, which may be optional in certain embodiments of the invention, a determination may be made as to whether the modified digital content (i.e., the digital content following the attack of the digital watermark) should be output by the watermark attacking device 110 in real-time or near real-time. For example, a determination may be made as to whether the modified digital content should be output for real-time receipt by one or more output devices, such as the output devices 115 illustrated in FIG. 1. If it is determined at block 215 that the modified digital content should be output in real-time or near real-time, then operations may continue at block 220. At block 220, the modified digital content may be output by the watermark attacking device 110 for receipt by one or more output devices 115. For example, the modified digital content may be output via any number of suitable I/O interfaces and/or output terminals for provision to the output devices 115. Operations may end following block 220.

If, however, it is determined at block 215 that the modified digital content should not be output in real-time or near real-time, then operations may continue at block 225. At block 225, the watermark attacking device 110 may direct the storage of the modified digital content. In certain embodiments, the modified digital content may be stored in one or more memory devices associated with the watermark attacking device 110. In other embodiments, the modified digital content may be stored in and/or written to one or more external memory devices, such as a CD-ROM, a DVD, an external magnetic disc hard drive, a removable memory device, etc. As desired, any number of suitable memory writing components, such as burning devices, may be incorporated into and/or be in communication with the watermark attacking device 110.

The method 200 may end following either block 220 or block 225.

Figure 3:
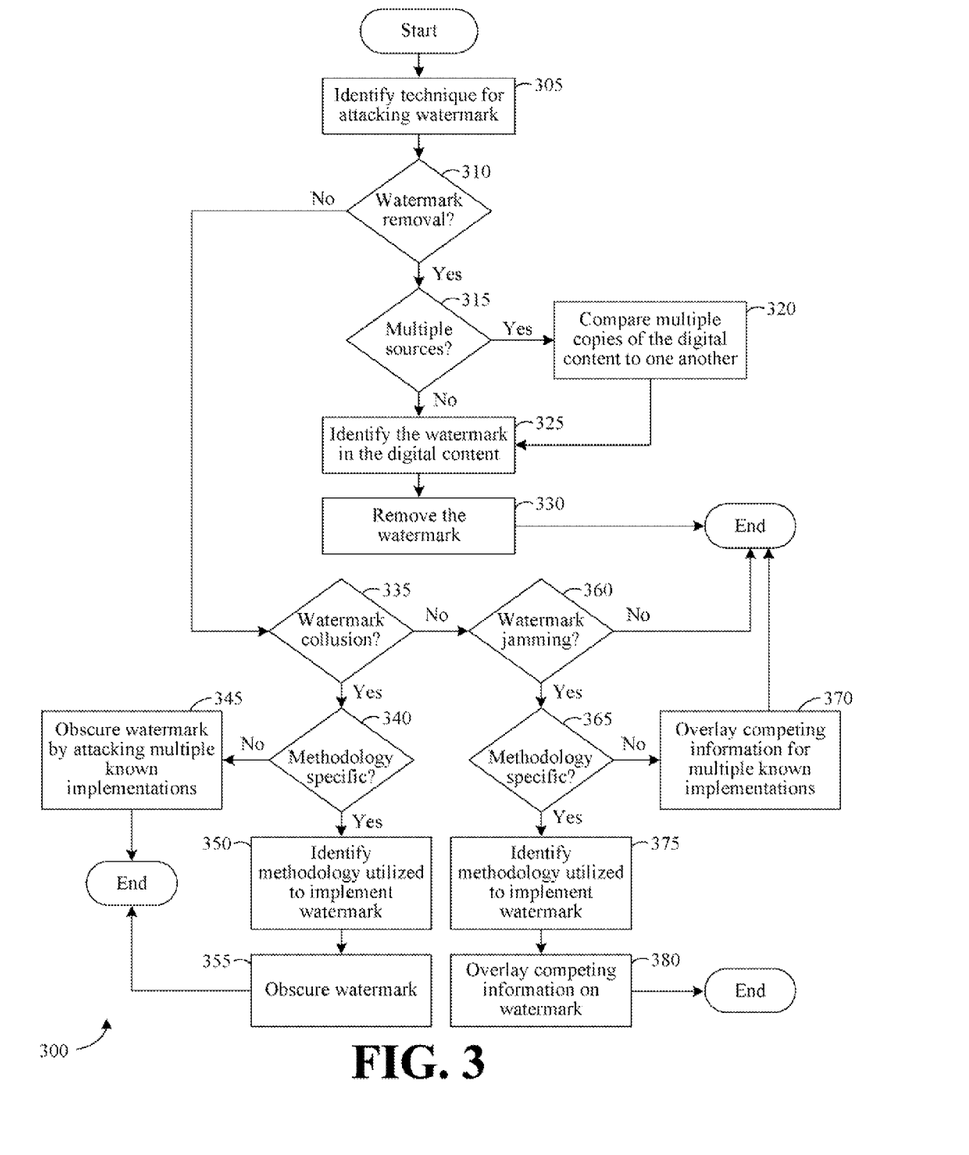
FIG. 3 is a flow diagram of an example method for attacking a digital watermark, according to an example embodiment of the invention.

FIG. 3 is a flow diagram of an example method 300 for attacking a digital watermark, according to an example embodiment of the invention. The method 300 may be one example of the operations that are performed at block 210 illustrated in FIG. 2. As such, the method 300 may be performed by a suitable watermark attacking device and/or watermark attack application, such as the watermark attacking device 110 and/or the watermark attack application 172 illustrated in FIG. 1. The method 300 may begin at block 305.

At block 305, one or more techniques may be identified for attacking one or more digital watermarks included in digital content. A wide variety of suitable techniques may be utilized as desired for attacking digital watermarks, including but not limited to, watermark removal, watermark collusion, and/or watermark jamming. As desired, different techniques may be utilized for different types of digital content. For example, different techniques may be utilized to attack watermarks included in digital audio content and watermarks included in digital video content. Additionally, as desired, different techniques may be utilized for real-time applications and non-real-time applications.

At block 310, a determination may be made as to whether a watermark removal technique should be utilized to attack a digital watermark. In other words, a determination may be made as to whether an attempt will be made to identify the portion of the digital content associated with the digital watermark such that the identified portion of the digital content may be altered and/or removed. If it is determined at block 310 that a watermark removal technique should not be utilized, then operations may continue at block 335 described in greater detail below. If, however, it is determined at block 310 that a watermark removal technique should be utilized, then operations may continue at block 315.

At block 315, a determination may be made as to whether multiple sources are available for receiving the digital content. For example, a determination may be made as to whether multiple copies of the digital content are available from a plurality of different service reception devices 105. If it is determined at block 315 that multiple sources are available, then operations may continue at block 320. At block 320, multiple copies of the digital content may be compared to one another, and differences between the different copies of the digital content may be identified. Because these different versions of the digital content likely include different watermarks, the data associated with the identified differences may be identified at block 325 as data associated with a digital watermark. Accordingly, digital watermarks included in the various copies of the digital content may be identified. If, however, it is determined at block 315 that multiple sources are not available, then operations may continue at block 325, and one or more attempts may be made to identify a digital watermark included in the digital content. A wide variety of suitable methods and/or techniques may be utilized as desired at block 325 to identify a digital watermark. For example, a watermark may be detected based upon an identification of data that is not optimal for a given portion or area of the digital content. For example, a portion of the digital content that includes additional data or a portion of the digital content that includes data having a frequency outside of a perceptible range may be identified. Once a digital watermark is identified at block 325, operations may continue at block 330.

At block 330, the identified digital watermark may be removed or extracted from the digital content. For example, in certain embodiments, data bits associated with the digital watermark may be deleted or removed from the digital content. In other embodiments, data bits associated with the digital watermark may be replaced or modified in order to remove the digital watermark. For example, data bits associated with a watermark embedded in a digital image or digital video signal may be modified to reflect a value of adjacent data bits that are not part of the digital watermark. In this regard, distortion of the image or video may be minimized and/or avoided. Operations may then either end or, as desired, continue at block 335.

At block 335, a determination may be made as to whether a watermark collusion technique should be utilized to attack a digital watermark. In other words, a determination may be made as to whether an attempt will be made to obscure a digital watermark to prevent subsequent identification, recognition, and/or decoding of the digital watermark by other devices. With a collusion technique, subsequent decoding of the digital watermark may be prevented and/or made more difficult. If it is determined at block 335 that a watermark collusion technique should not be utilized, then operations may continue at block 360 described in greater detail below. If, however, it is determined at block 335 that a watermark collusion technique should be utilized, then operations may continue at block 340.

At block 340, a determination may be made as to whether a methodology-specific collusion attack should be performed. In other words, a determination may be made as to whether one or more specific types of digital watermarks (e.g., spatially-based watermarks, geometrically invariant watermarks, etc.) should be attacked. If it is determined at block 340 that a methodology-specific collusion attack should not be performed, then operations may continue at block 345, and a relatively brute force collusion attack may be performed by attacking a plurality of known watermark types or watermark implementations. A wide variety of suitable techniques and/or methods may be utilized as desired to perform a collusion attack. Additionally, as desired in certain embodiments, multiple copies of the digital content may be obtained from different service reception devices 105 and utilized to perform a collusion attack. For example, multiple copies of the digital content may be averaged together in order to collude a digital watermark.

If, however, it is determined at block 340 that a methodology-specific collusion attack should be performed, then operations may continue at block 350. At block 350, one or more methodologies utilized to embed or implement the digital watermark may be identified. In other words, a type of digital watermark may be identified. A wide variety of different types of digital watermarks may be identified as desired in various embodiments of the invention. Additionally, a wide variety of suitable methods and/or techniques may be utilized as desired to identify watermarking methodologies.

Once a watermarking methodology has been identified at block 350, operations may continue at block 355. At block 355, a collusion attack may be performed based at least in part upon the identified watermark type or methodology. For example, if it is determined that the watermark was embedded utilizing a geometrically invariant methodology, then a portion of the digital content in which the watermark is embedded (e.g., a corner of a digital image or video frame, etc.) may be colluded. As another example, if it is determined that the watermark was embedded utilizing an object-based methodology, then digital bits associated with an embedded object may be colluded. Indeed, a wide variety of different types of watermarks and/or watermarking methodologies may be specifically attacked utilizing a collusion technique.

With continued reference to FIG. 3, a determination may be made at block 360 as to whether a watermark jamming technique should be utilized to attack a digital watermark. In other words, a determination may be made as to whether an attempt will be made to overwrite or overlay information on a digital watermark to prevent subsequent processing of the digital watermark by other devices. When a jamming technique is utilized, a, subsequent device may be able to identify and decode a watermark; however, the overwritten information may result in an inability to utilize or process the decoded watermark information. In other words, the decoded watermark information will be incorrect. If it is determined at block 360 that a watermark jamming technique should not be utilized, then operations may end. If, however, it is determined at block 360 that a watermark jamming technique should be utilized, then operations may continue at block 365.

At block 365, a determination may be made as to whether a methodology-specific jamming attack should be performed. In other words, a determination may be made as to whether one or more specific types of digital watermarks (e.g., spatially-based watermarks, geometrically invariant watermarks, etc.) should be attacked. If it is determined at block 365 that a methodology-specific jamming attack should not be performed, then operations may continue at block 370, and a relatively brute force jamming attack may be performed by attacking a plurality of known watermark types or watermark implementations. A wide variety of suitable techniques and/or methods may be utilized as desired to perform a jamming attack. For example, all or substantially all of the data included in the digital content may be modified or altered in order to overwrite a digital watermark.

If, however, it is determined at block 365 that a methodology-specific jamming attack should be performed, then operations may continue at block 375. At block 375, one or more methodologies utilized to embed or implement the digital watermark may be identified. In other words, a type of digital watermark may be identified. A wide variety of different types of digital watermarks may be identified as desired in various embodiments of the invention. Additionally, a wide variety of suitable methods and/or techniques may be utilized as desired to identify watermarking methodologies.

Once a watermarking methodology has been identified at block 375, operations may continue at block 380. At block 380, a jamming attack may be performed based at least in part upon the identified watermark type or methodology. For example, if it is determined that the watermark was embedded utilizing a geometrically invariant methodology, then a portion of the digital content in which the watermark is embedded (e.g., a corner of a digital image or video frame, etc.) may be overwritten. As another example, if it is determined that the watermark was embedded utilizing an object-based methodology, then digital bits associated with an embedded object may be overwritten. Indeed, a wide variety of different types of watermarks and/or watermarking methodologies may be specifically attacked utilizing a jamming technique.

The method 300 may end following either block 330, 345, 355, 360, 370, or 380.

The operations described and shown in the methods 200, 300 of FIGS. 2 and 3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2 and 3 may be performed.

Various block and/or flow diagrams of systems, methods, apparatus, and/or computer program products according to example embodiments of the invention are described above.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
   at least one interface configured to receive a first copy of a digital content, comprising a first digital watermark, and a second copy of the digital content, comprising a second digital watermark distinct from the first digital watermark, output by respective service reception devices; and
   at least one processing component configured to:

determine a technique for attacking at least one of the first or second digital watermarks based at least in part on an identification of a type associated with the first or second digital watermarks wherein the attack comprises watermark removal;

determine that multiple copies of the digital content are available;

compare, based at least in part on the determined technique, at least the first and second copies of the digital content to identify data bits that are different between at least the first and second copies;

identify at least one of the first or second digital watermarks based at least in part on the comparison; and remove the identified first or second digital watermark based at least in part on its identification.

2. The system of claim 1, wherein the service reception devices comprises one or more of (i) a set-top box, (ii) a virtual set-top box, (iii) an embedded set-top box, (iv) a modem, or (v) a mobile device.

3. The system of claim 1, wherein the digital content comprises at least one of (i) audio content or (ii) video content.

4. The system of claim 1, wherein the first digital watermark comprises one of (i) a digital watermark that cannot be perceived by a user when the digital content is output or (ii) a digital watermark that does not substantially affect the ability of the user to consume the digital content when the digital content is output.

5. The system of claim 1, wherein the at least one processing component is further configured to output the digital content in real-time subsequent to attacking the digital watermark.

6. The system of claim 1, wherein the at least one processing component is further configured to direct, subsequent to attacking the digital watermark, the storage of the digital content.

7. The system of claim 1, wherein the first digital watermark comprises one of (i) a spatially-based watermark, (ii) a geometrically invariant watermark, (iii) a time-based watermark, (iv) an object-based watermark, (v) a scene-based watermark, (vi) a watermark that utilizes a perceptual mask, or (vii) a multiple orthogonal watermark.

8. A system comprising:
at least one memory configured to store computer-executable instructions; and
at least one processor configured to access the at least one memory and execute the computer-executable instructions to:
receive digital content output by a service reception device, wherein the service reception device is configured to receive the digital content from a service provider;
identify a first digital watermark incorporated into the digital content;
determine a technique for attacking the digital watermarks based at least in part on an identification of a type associated with the digital watermark, wherein the attack comprising watermark removal;
determine that at least one additional copy of the digital content is available, the at least one additional copy comprising a second digital watermark distinct from the first digital watermark;
compare, based at least in part on the determined technique, the digital content to the at least one additional copy of the digital content to identify data bits that are different in the digital content as compared at least one additional copy of the digital content to identify the second digital watermark and
remove the second digital watermark based at least in part on the comparison.

9. The system of claim 8, wherein the service reception device comprises one of (i) a set-top box, (ii) a virtual set-top box, (iii) an embedded set-top box, (iv) a modem, or (v) a mobile device.

10. The system of claim 8, wherein the digital content comprises at least one of (i) audio content or (ii) video content.

11. The system of claim 8, wherein the digital watermark comprises at least one of (i) a digital watermark that cannot be perceived by a user when the digital content is output or (ii) a digital watermark that does not substantially affect the ability of the user to consume the digital content when the digital content is output.

12. The system of claim 8, wherein the at least one processing component is further configured to execute the computer-executable instructions to output the digital content in real-time subsequent to attacking the digital watermark.

13. The system of claim 8, wherein the at least one processing component is further configured to execute the computer-executable instructions to direct, subsequent to attacking the digital watermark, the storage of the digital content.

14. The system of claim 8, wherein the digital watermark comprises one of (i) a spatially-based watermark, (ii) a geometrically invariant watermark, (iii) a time-based watermark, (iv) an object-based watermark, (v) a scene-based watermark, (vi) a watermark that utilizes a perceptual mask, or (vii) a multiple orthogonal watermark.

* * * * *